(12) United States Patent
Kora (10) Patent No.: US 12,105,065 B2
(45) Date of Patent: Oct. 1, 2024

(54) MOBILE PHASE TEMPERATURE CONTROL DEVICE FOR SUPERCRITICAL FLUID APPARATUS AND SUPERCRITICAL FLUID APPARATUS

(71) Applicant: SHIMADZU CORPORATION, Kyoto (JP)

(72) Inventor: Chihiro Kora, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 424 days.

(21) Appl. No.: 17/616,627

(22) PCT Filed: Jun. 11, 2019

(86) PCT No.: PCT/JP2019/023154
§ 371 (c)(1),
(2) Date: Dec. 3, 2021

(87) PCT Pub. No.: WO2020/250315
PCT Pub. Date: Dec. 17, 2020

(65) Prior Publication Data
US 2022/0252560 A1    Aug. 11, 2022

(51) Int. Cl.
*G01N 30/54* (2006.01)
*G01N 30/30* (2006.01)
*G01N 30/28* (2006.01)

(52) U.S. Cl.
CPC ............ *G01N 30/54* (2013.01); *G01N 30/30* (2013.01); *G01N 2030/285* (2013.01)

(58) Field of Classification Search
CPC .. G01N 30/54; G01N 30/30; G01N 2030/285; G01N 2030/3053; Y02P 20/54; B01D 15/161; B01D 15/40
See application file for complete search history.

(56) References Cited

U.S. PATENT DOCUMENTS 5,094,741 A    3/1992    Frank et al.
5,108,264 A *  4/1992    Abdel-Rahman ... F04B 11/0075
                                                    417/20
(Continued)

FOREIGN PATENT DOCUMENTS

JP    04-222602 A    8/1992
JP    2011-118880 A    6/2011
(Continued)

OTHER PUBLICATIONS

International Search Report for corresponding Application No. PCT/JP2019/023154, mailed Sep. 10, 2019.
(Continued)

*Primary Examiner* — Tarun Sinha
(74) *Attorney, Agent, or Firm* — Renner, Otto, Boisselle & Sklar, LLP (57) ABSTRACT

A mobile phase temperature control device for a supercritical fluid apparatus is used in a supercritical fluid apparatus including a separation column, and includes a cartridge heater, a flow path portion and a first temperature sensor. The cartridge heater has a rod shape. The flow path portion is wound around the cartridge heater, and a mobile phase is guided to the separation column of the supercritical fluid apparatus by the flow path portion. The mobile phase is put in a supercritical state at least in the separation column. The first temperature sensor is attached to the flow path portion, and the temperature of the flow path portion is detected by the first temperature sensor.

9 Claims, 4 Drawing Sheets

(56) References Cited

U.S. PATENT DOCUMENTS

| | | | |
|---|---|---|---|
| 5,133,859 A | | 7/1992 | Frank et al. |
| 5,240,603 A | | 8/1993 | Frank et al. |
| 5,322,626 A | | 6/1994 | Frank et al. |
| 8,875,981 B2 | * | 11/2014 | Neltner ................ B01J 19/0046 |
| | | | 228/101 |
| 2011/0094606 A1 | * | 4/2011 | Kanomata ............ G05D 16/202 |
| | | | 137/487.5 |
| 2015/0198382 A1 | | 7/2015 | Waldbaur |
| 2016/0274071 A1 | | 9/2016 | Yamamoto |
| 2018/0074026 A1 | * | 3/2018 | Goto ....................... F16L 53/38 |
| 2019/0030456 A1 | | 1/2019 | Waldbaur |
| 2019/0277736 A1 | | 9/2019 | Okado |

FOREIGN PATENT DOCUMENTS

| | | |
|---|---|---|
| JP | 2015-179016 A | 10/2015 |
| JP | 2016-173343 A | 9/2016 |
| WO | 2016/147379 A1 | 9/2016 |
| WO | 2018/220682 A1 | 12/2018 |

OTHER PUBLICATIONS

Written Opinion for corresponding Application No. PCT/JP2019/023154, mailed Sep. 10, 2019 (English Machine Translation).

Notice of Reasons for Refusal in corresponding JP Patent Application No. 2021-525451 dated Jan. 10, 2023, with English machine translation.

* cited by examiner

MOBILE PHASE TEMPERATURE CONTROL DEVICE FOR SUPERCRITICAL FLUID APPARATUS AND SUPERCRITICAL FLUID APPARATUS

TECHNICAL FIELD

The present invention relates to a mobile phase temperature control device for a supercritical fluid apparatus, and a supercritical fluid apparatus.

BACKGROUND ART

In a supercritical fluid apparatus such as a supercritical fluid chromatograph (SFC) or a supercritical fluid extraction apparatus (SFE), a sample is analyzed or sorted with use of a supercritical fluid as a mobile phase. For example, in the SFC described in Patent Document 1, liquid carbon dioxide is supplied to a mobile phase flow path by a liquid sending pump as a mobile phase. Further, a sample is injected into the mobile phase flow path by a sample injector.

The mobile phase and the sample pass through a separation column arranged in the mobile phase flow path. Here, the pressure in the mobile phase flow path is maintained by a back-pressure valve, and the temperature in the separation column is maintained by a column oven, whereby the mobile phase is put in a supercritical state at least in the separation column. The sample is separated into sample components by passing through the separation column and detected by the detector.

[Patent Document 1] JP 2016-173343 A

SUMMARY OF INVENTION

Technical Problem

In the supercritical fluid apparatus, a mobile phase is cooled to a low temperature, and a large volume of the mobile phase is supplied to the column. Thus, a temperature gradient in regard to the mobile phase in the separation column is likely to occur due to a temperature of surrounding environment, etc. Here, in a case where a temperature gradient occurs in regard to the mobile phase, accuracy of separation of a sample by the separation column, and accuracy of detection by the detector are degraded. In particular, in the SFE, because a larger volume of a mobile phase is used, this problem is apparent. Therefore, it is desired that an occurrence of a temperature gradient in regard to a mobile phase in the separation column is suppressed.

An object of the present invention is to provide a mobile phase temperature control device for a supercritical fluid apparatus, and a supercritical fluid apparatus that can suppress an occurrence of a temperature gradient in regard to a mobile phase in a separation column.

Solution to Problem

One aspect according to the present invention relates to a mobile phase temperature control device for a supercritical fluid apparatus that is used in a supercritical fluid apparatus including a separation column to which a mobile phase in a supercritical state is supplied and includes a rod-shaped cartridge heater, a flow path portion that is wound around the cartridge heater and guides the mobile phase to the separation column, and a first temperature sensor that is attached to the flow path portion and detects a temperature of the flow path portion.

Advantageous Effects of Invention

With the present invention, an occurrence of a temperature gradient in regard to a mobile phase in a separation column can be suppressed.

DESCRIPTION OF EMBODIMENTS

(1) Configuration of Supercritical Fluid Apparatus

Figure 1:
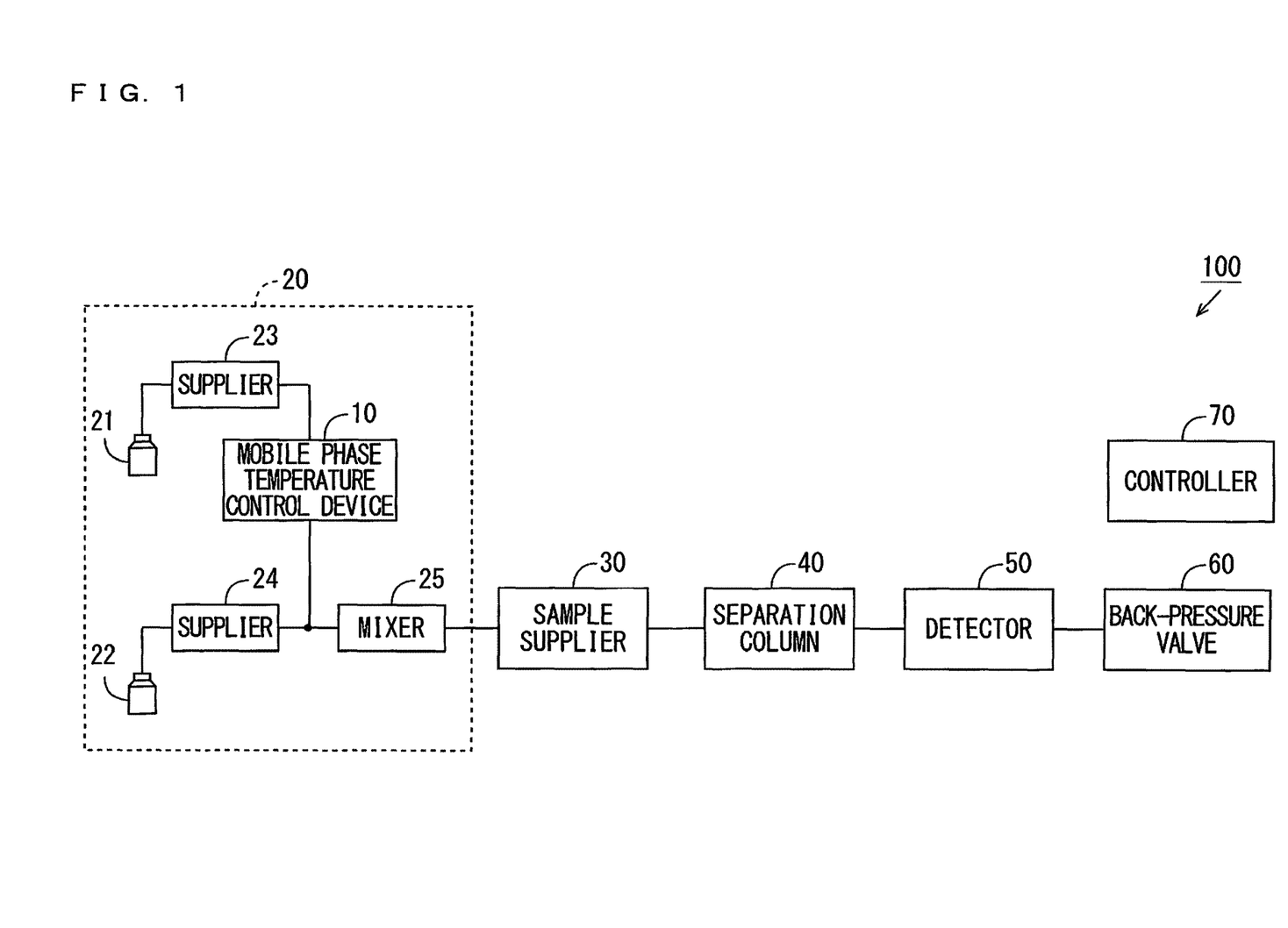
FIG. 1 is a diagram showing the configuration of a supercritical fluid apparatus according to one embodiment of the present invention.

Hereinafter, a mobile phase temperature control device for a supercritical fluid apparatus (hereinafter simply referred to as a mobile phase temperature control device), and a supercritical fluid apparatus according to embodiments of the present invention will be described below in detail with reference to the drawings. FIG. 1 is a diagram showing the configuration of the supercritical fluid apparatus according to one embodiment of the present invention. As shown in FIG. 1, the supercritical fluid apparatus 100 is a supercritical fluid chromatograph (SFC) and includes the mobile phase temperature control device 10, a mobile phase supplier 20, a sample supplier 30, a separation column 40, a detector 50, a back-pressure valve 60 and a controller 70. In the following description, the direction in which a mobile phase flows is defined as downstream, and its opposite direction is defined as upstream.

The mobile phase supplier 20 includes two bottles 21, 22, two suppliers 23, 24 and a mixer 25. Liquid carbon dioxide that is cooled to about 5° C., for example, is stored in the bottle 21 as a mobile phase. A modifier such as an organic solvent is stored in the bottle 22 as a mobile phase. The suppliers 23, 24 are liquid sending pumps, for example, and pump the mobile phases respectively stored in the bottles 21, 22. The suppliers 23, 24 are examples of first and second suppliers, respectively. The mixer 25 is a gradient mixer, for example, and supplies the mobile phases that have been respectively pumped by the suppliers 23, 24 while mixing the mobile phases at a predetermined ratio.

The mobile phase temperature control device 10 is provided in a flow path for liquid carbon dioxide that is located at a position farther upstream than the separation column 40. In the present embodiment, the mobile phase temperature control device 10 is provided between the supplier 23 and the mixer 25. The mobile phase temperature control device 10 preheats liquid carbon dioxide that has been pumped by the supplier 23 to a temperature equal to or larger than a critical temperature (about 40° C. in the present example) such that the liquid carbon dioxide in a mobile phase that has been supplied by the mobile phase supplier 20 is put in a supercritical state at least in the separation column 40. Details of the mobile phase temperature control device 10 will be described below.

The sample supplier 30 is an injector, for example, and introduces a sample to be analyzed into the separation column 40 together with the mobile phase that has been supplied by the mobile phase supplier 20. The separation column 40 is contained in a column oven (not shown) and is heated to a predetermined temperature (about 40° C. in the present example) such that the liquid carbon dioxide in the introduced mobile phase is put in a supercritical state. The separation column 40 separates the introduced sample into components according to differences in chemical property or composition.

The detector 50 includes an absorbance detector, for example, and detects components into which a sample has been separated by the separation column 40. A result of detection by the detector 50 is used to generate a supercritical fluid chromatogram representing the relationship between a retention time of each component and a detection intensity, for example. The back-pressure valve 60 maintains the pressure applied to the mobile phase in the flow path at a pressure equal to or larger than a critical pressure of carbon dioxide (8 MPa, for example) such that the liquid carbon dioxide in the mobile phase is put in a supercritical state at least in the separation column 40.

The controller 70 includes a CPU (Central Processing Unit) and a memory, or a microcomputer or the like and controls the operation of each of the mobile phase temperature control device 10, the mobile phase supplier 20, the sample supplier 30, the separation column 40 (the column oven), the detector 50 and the back-pressure valve 60. Further, in a case where a sorting device such as a fraction collector is provided at a position farther downward than the back-pressure valve 60, the controller 70 further controls the operation of the sorting device based on a result of detection by the detector 50. The controller 70 may be provided in the back-pressure valve 60.

(2) Configuration of Mobile Phase Temperature Control Device

Figure 2:
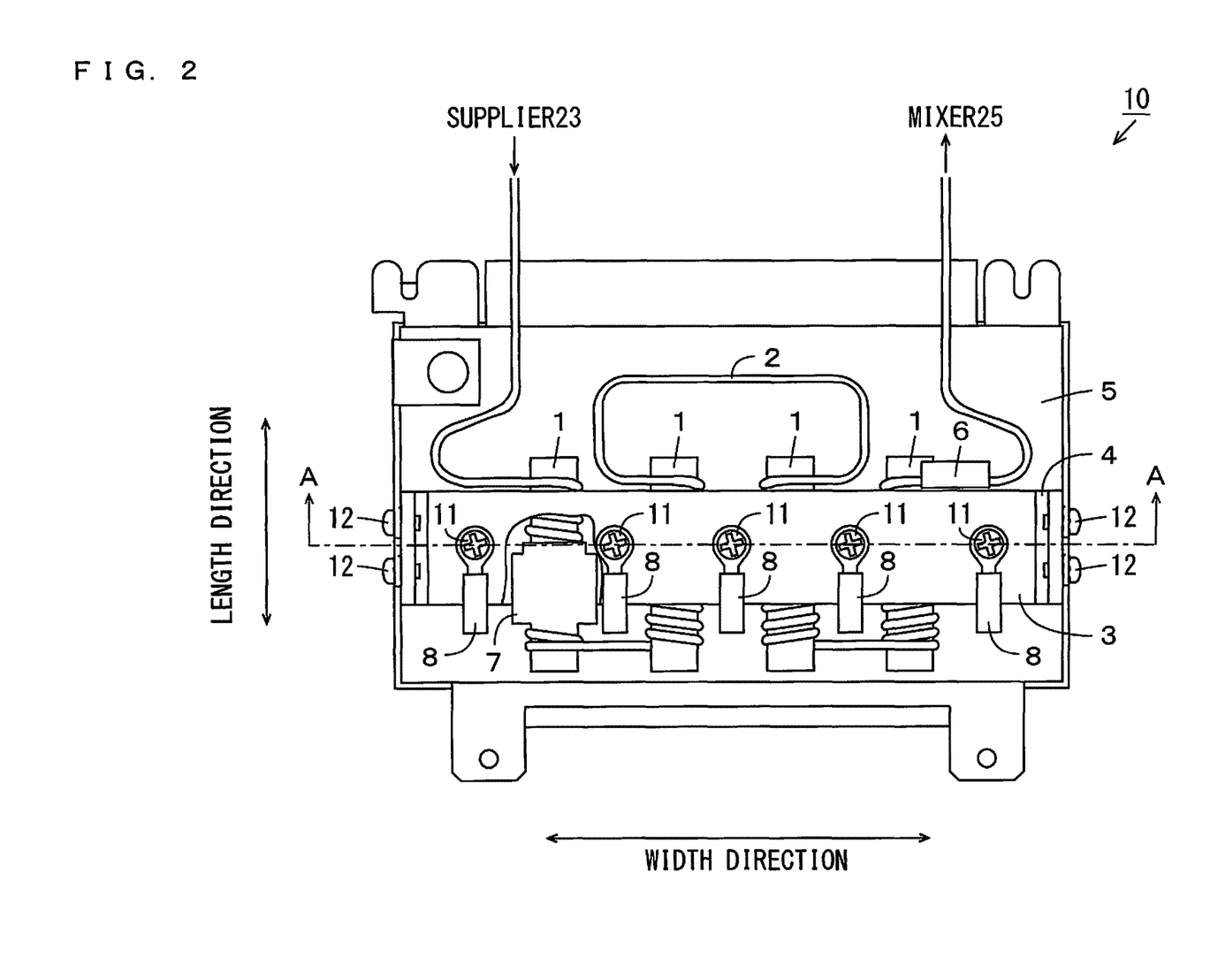
FIG. 2 is a diagram showing the configuration of a mobile phase temperature control device of FIG. 1.
Figure 3:
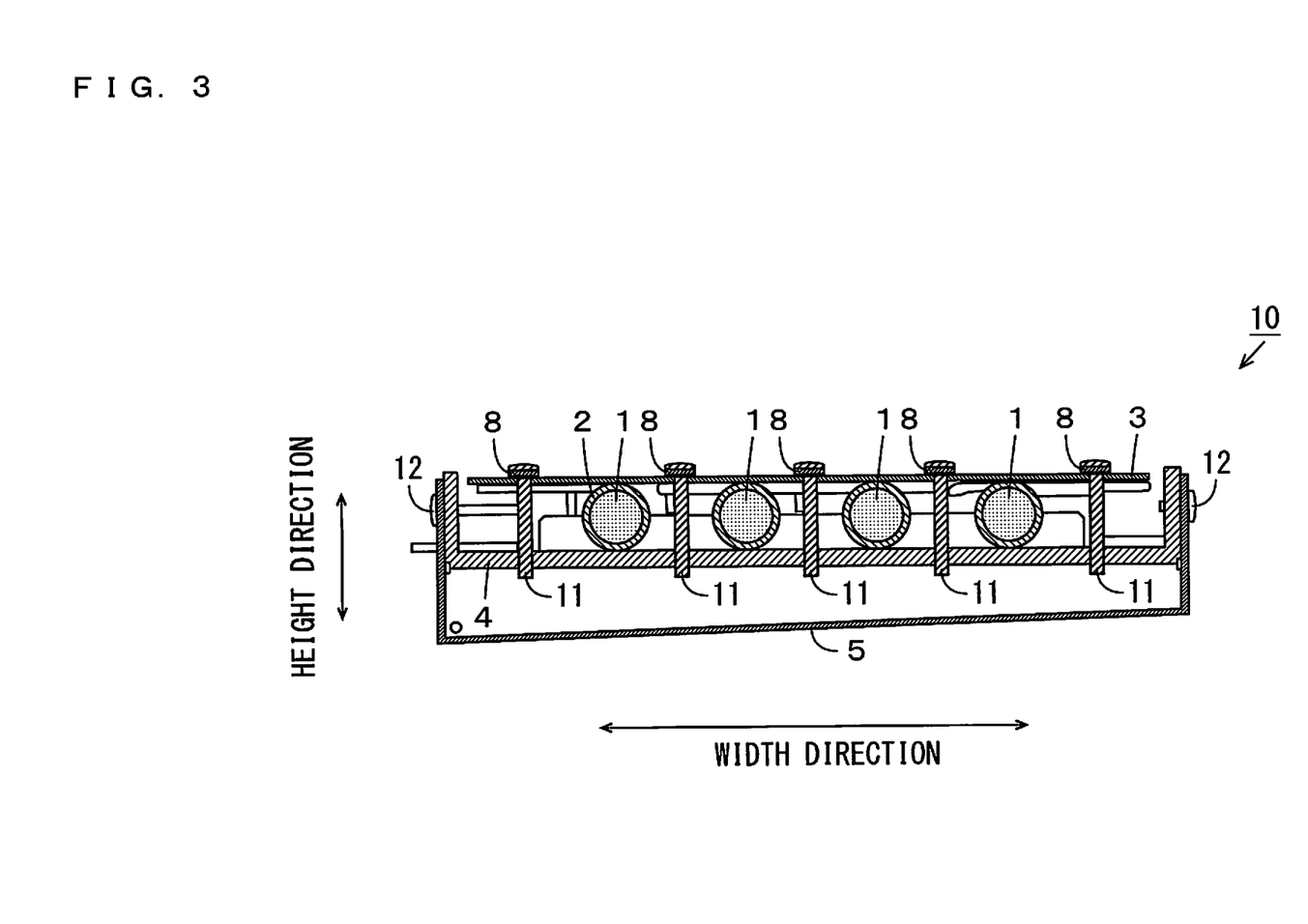
FIG. 3 is a cross sectional view taken along the line A-A of the mobile phase temperature control device of FIG. 2.

FIG. 2 is a diagram showing the configuration of the mobile phase temperature control device 10 of FIG. 1. FIG. 3 is a cross sectional view taken along the line A-A of the mobile phase temperature control device 10 of FIG. 2. In the following description, a left-and-right direction on the sheets of FIGS. 2 and 3 is referred to as a width direction, an up-and-down direction on the sheet of FIG. 2 is referred to as a length direction, and an up-and-down direction on the sheet of FIG. 3 is referred to as a height direction. The width direction, the length direction and the height direction are orthogonal to one another.

As shown in FIGS. 2 and 3, the mobile phase temperature control device 10 includes a plurality of cartridge heaters 1, a flow path portion 2, metal sheets 3, 4, a fixture 5, a first temperature sensor 6, a second temperature sensor 7 and a plurality of third temperature sensors 8. Further, the mobile phase temperature control device 10 further includes a driver 9 (see FIG. 4, described below) for driving the plurality of cartridge heaters 1. The driver 9 is a 24 V power supply, for example.

Each cartridge heater 1 has the configuration in which a coil-shaped heat generator is covered by a metallic cylindrical element. Therefore, each cartridge heater 1 has a rod shape extending in one direction (a columnar shape having the outer diameter of 10 mm and the length of 45 mm in the present example). In the present example, four cartridge heaters 1, each of which generates a heat amount of 100 W, are connected in series. Therefore, the total amount of heat to be generated by the four cartridge heaters 1 is 400 W. The four cartridge heaters 1 extend in the length direction and are arranged in the width direction at substantially equal intervals.

The flow path portion 2 is a pipe, for example, is provided to connect the supplier 23 and the mixer 25 of FIG. 1 to each other and be wound around the four cartridge heaters 1. Specifically, four portions in the flow path portion 2 are formed in a coil shape having an inner diameter (9.5 mm, for example) slightly smaller than the outer diameter of each cartridge heater 1. The four cartridge heaters 1 are respectively fitted to the four portions formed in the coil shape in the flow path portion 2, so that the flow path portion 2 is wound around the four cartridge heaters 1.

A state where liquid carbon dioxide is flowing through the flow path portion 2 is referred to as a liquid flow state, and a state in which liquid carbon dioxide is not flowing through the flow path portion 2 is referred to as a liquid non-flow state. With the above-mentioned method of attaching the flow path portion 2, the flow path portion 2 comes into contact with the plurality of cartridge heaters 1 with the inner peripheral surface of the flow path portion 2 adhering to the columnar outer peripheral surfaces of the plurality of cartridge heaters 1. Thus, contact thermal resistance (heat loss) between the flow path portion 2 and the plurality of cartridge heaters 1 is reduced. Therefore, in the liquid flow state, liquid carbon dioxide that has been pumped by the supplier 23 is guided to the mixer 25 while being preheated by the four cartridge heaters 1 efficiently and with high responsiveness.

The metal sheet 3 has a flat-plate shape. The cross section of the metal sheet 4 has a concave shape (see FIG. 3). The metal sheet 3 and the metal sheet 4 are fixed by a plurality (five in the present example) of screw members 11 while holding the four cartridge heaters 1 around which the flow path portion 2 is wound. Specifically, the five screw members 11 are respectively inserted into five openings of the metal sheet 3 between two cartridge heaters 1 that are adjacent to each other in the width direction and at both ends in the width direction. In this state, tips of the five screw members 11 are respectively engaged with five screw holes of the metal sheet 4. Thus, the four cartridge heaters 1 are integrated.

The cross section of the fixture 5 has a concave shape (see FIG. 3). One end surface and the other end surface of the metal sheet 4 in the width direction are respectively attached to one end surface and the other end surface of the fixture 5 in the width direction by two screw members 12, for example. Thus, the mobile phase temperature control device 10 can be a relatively small heating module. In the present example, the dimensions of the mobile phase temperature control device 10 in the width direction, the length direction and the height direction are respectively about 130 mm, about 100 mm and about 60 mm. The fixture 5 is attached to a desired portion in the supercritical fluid apparatus 100, so that the four integrated cartridge heaters 1 can be fixed to the portion.

Each of the first and second temperature sensors 6, 7 includes a thermistor, for example. The first temperature sensor 6 is attached to a downstream portion in the flow path portion 2 and detects the temperature in the downstream portion in the flow path portion. The second temperature sensor 7 is attached to an upstream portion in the flow path portion 2 and detects the temperature in the upstream portion in the flow path portion.

In the present example, the first temperature sensor 6 is attached to a portion of the flow path portion 2 that is pulled out from the cartridge heater 1 arranged most downstream out of the four cartridge heaters 1. The second temperature sensor 7 is attached to a portion of the flow path portion 2 that is wound around the cartridge heater 1 arranged most upstream out of the four cartridge heaters 1. In FIG. 2, part of the metal sheet 3 is cut out virtually in the diagram in order to facilitate viewing of the second temperature sensor 7.

Because each of the first and second temperature sensors 6, 7 is directly attached to the surface of the flow path portion 2, the temperature of the flow path portion 2 can be detected accurately as the temperature of liquid carbon dioxide flowing through the flow path portion 2. Each of the first and second temperature sensors 6, 7 may be fixed to the flow path portion 2 by a conductive tape or a conductive adhesive having high heat transfer property. In this case, the temperature of the flow path portion 2 can be detected with higher accuracy.

Each of the plurality of third temperature sensors 8 includes a thermistor in a lug terminal, for example. In the present example, the five third temperature sensors 8 are respectively fixed to the metal sheet 3 by the above-mentioned five screw members 11 to be capable of detecting the temperatures of the four cartridge heaters 1 through the metal sheet 3. Therefore, each of the four cartridge heaters 1 is located between two third temperature sensors 8 that are adjacent to each other in the width direction. Because each third temperature sensor 8 detects the temperature of any cartridge heater 1 through the metal sheet 3, the metal sheet 3 is preferably formed of a member having high thermal conductivity (metal including aluminum, for example).

(3) Configuration of Controller

Figure 4:
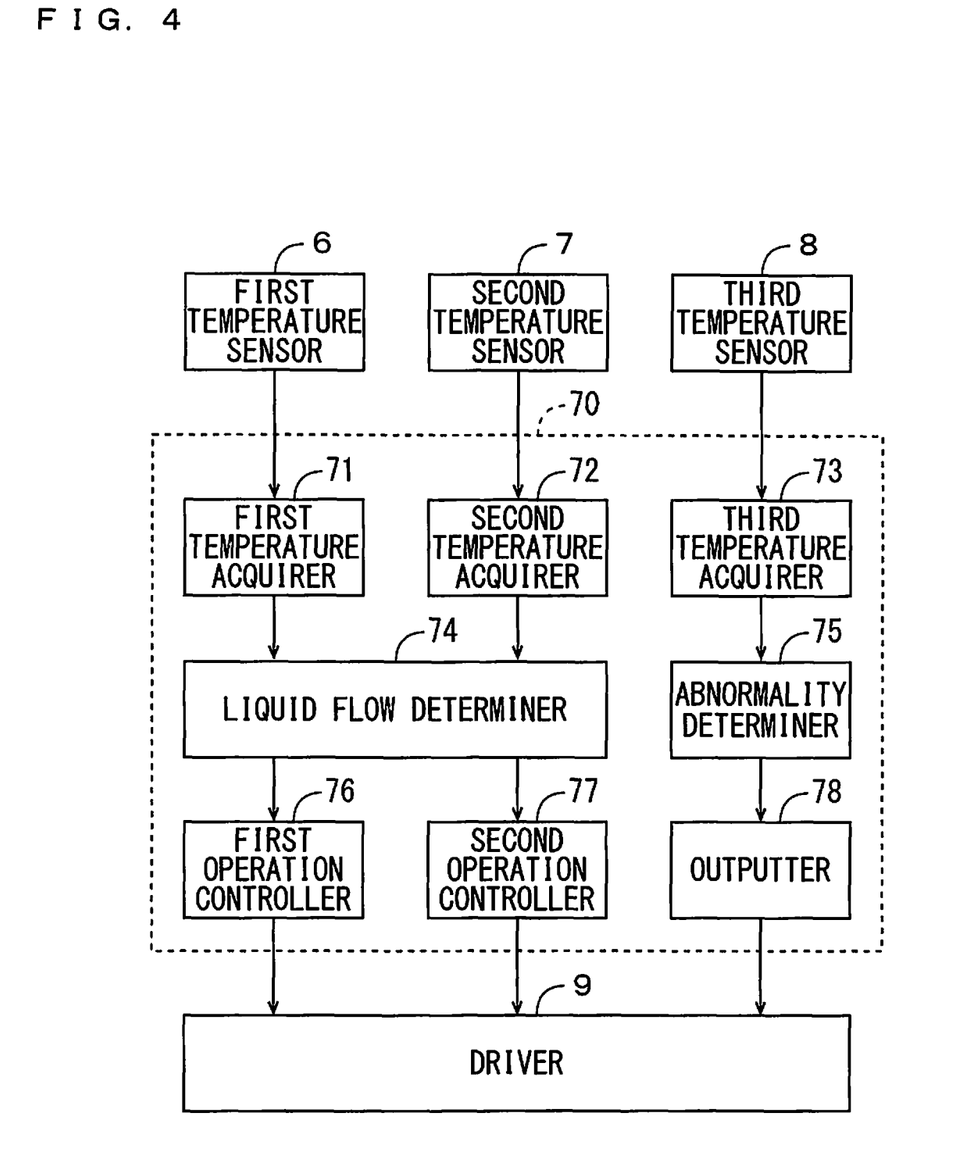
FIG. 4 is a block diagram showing the configuration of a controller of FIG. 1.

FIG. 4 is a block diagram showing the configuration of the controller 70 of FIG. 1. As shown in FIG. 4, the controller 70 includes a first temperature acquirer 71, a second temperature acquirer 72, a third temperature acquirer 73, a liquid flow determiner 74, an abnormality determiner 75, a first operation controller 76, a second operation controller 77 and an outputter 78. A CPU of the controller 70 executes a predetermined application program stored in a memory, so that the functions of the controller 70 are implemented. Part or all of the functions of the controller 70 may be implemented by hardware such as an electronic circuit.

The first temperature acquirer 71 acquires the temperature of the downstream portion of the flow path portion 2 detected by the first temperature sensor 6. The second temperature acquirer 72 acquires the temperature of the upstream portion of the flow path portion 2 detected by the second temperature sensor 7. The third temperature acquirer 73 acquires the temperatures of the plurality of portions of the flow path portion 2 detected by the plurality of third temperature sensors 8.

The liquid flow determiner 74 is an example of a determiner and determines whether the flow path portion 2 is in the liquid flow state based on the temperatures acquired by the first and second temperature acquirers 71, 72. Specifically, in the liquid flow state, the temperature of the downstream portion of the flow path portion 2 is equal to or larger than the temperature of the upstream portion of the flow path portion 2. In the liquid non-flow state, the temperature of the downstream portion of the flow path portion 2 is smaller than the temperature of the upstream portion of the flow path portion 2. As such, in a case where the temperature detected by the first temperature acquirer 71 is equal to or larger than the temperature detected by the second temperature acquirer 72, it is determined that the flow path portion 2 is in the liquid flow state. In a case where the temperature detected by the first temperature acquirer 71 is smaller than the temperature detected by the second temperature acquirer 72, it is determined that the flow path portion 2 is in the liquid non-flow state.

The abnormality determiner 75 determines whether the plurality of cartridge heaters 1 are operating normally based on the temperatures of the plurality of locations acquired by the third temperature acquirer 73. In a case where the temperatures of the plurality of locations acquired by the third temperature acquirer 73 are substantially uniform, it is determined that the plurality of cartridge heaters 1 are operating normally. In a case where part of the temperatures of the plurality of locations acquired by the third temperature acquirer 73 extremely diverges from the other temperatures, it is not determined that the plurality of cartridge heaters 1 are operating normally. It is determined that any of the cartridge heaters 1 is operating abnormally.

In a case where it is determined by the liquid flow determiner 74 that the flow path portion 2 is in the liquid flow state, the first operation controller 76 controls the operation of the driver 9 such that the temperature acquired by the first temperature acquirer 71 is a predetermined value (about 40° C., for example). In this case, the operation of the driver 9 is controlled precisely, and an appropriate drive voltage is supplied to the plurality of cartridge heaters 1 by the driver 9 such that the temperature of liquid carbon dioxide flowing through the flow path portion 2 is a predetermined value.

In a case where it is determined by the liquid flow determiner 74 that the flow path portion 2 is in the liquid non-flow state, the second operation controller 77 controls the operation of the driver 9 such that the plurality of cartridge heaters 1 are turned on and off repeatedly and regularly. In this case, the temperature of the flow path portion 2 during the wait can be maintained in a predetermined range with simple control.

In a case where it is determined by the abnormality determiner 75 that the operation of any of the cartridge heater 1 is abnormal, the outputter 78 controls the driver 9 such that the supply of a voltage to the plurality of cartridge heaters 1 is stopped. Alternatively, the outputter 78 may output a warning indicating that the operation of any of the cartridge heater 1 is abnormal together with the above-mentioned control of the driver 9 or instead of the control of the driver 9. As output of a warning, a warning sound may be generated with use of an alarm, or a warning may be displayed using a lamp or the like, for example.

(4) Effects

In the mobile phase temperature control device 10 according to the present embodiment, because the flow path portion 2 is wound around the rod-shape cartridge heaters 1, heat is exchanged between the cartridge heaters 1 and the flow path portion 2 with reduced contact thermal resistance and high responsiveness. Here, because the first temperature sensor 6 is attached to the downstream portion of the flow path portion 2, the temperature of the flow path portion 2 can be detected as the temperature of liquid carbon dioxide flowing through the flow path portion 2 with high accuracy. Therefore, based on the detected temperature, the temperature of liquid carbon dioxide flowing through the flow path portion 2 can be adjusted by the cartridge heaters 1.

Further, because the flow path portion 2 is wound, even in a case where the sufficiently long flow path portion 2 is used, the mobile phase temperature control device 10 is maintained compact. Therefore, even in a case where the temperature of liquid carbon dioxide is low and the volume of the liquid carbon dioxide is large, it is possible to efficiently adjust the temperature of the liquid carbon dioxide to a predetermined temperature by using the sufficiently long flow path portion 2. As a result, an occurrence of a temperature gradient in regard to liquid carbon dioxide in the separation column 40 can be suppressed.

(5) Other Embodiments (a) While the mobile phase temperature control device 10 includes the four cartridge heaters 1 in the above-mentioned embodiment, the embodiment is not limited to this. The mobile phase temperature control device 10 may include five or more cartridge heaters 1, or may include three, two or one cartridge heater 1. In a case where the mobile phase temperature control device 10 includes one cartridge heater 1, the first temperature sensor 6 may be attached to a position closer to a downstream end portion than an upstream end portion of the flow path portion 2 that comes into contact with the cartridge heater 1.

(b) While the cartridge heater 1 is columnar in the above-mentioned embodiment, the embodiment is not limited to this. The cartridge heater 1 may have an elliptical cylinder shape or may have another rod shape such as another prismatic shape.

(c) While the mobile phase temperature control device 10 includes the second temperature sensor 7 and the plurality of third temperature sensors 8 in the above-mentioned embodiment, the embodiment is not limited to this. The mobile phase temperature control device 10 does not have to include part or all of the second temperature sensor 7 and the plurality of third temperature sensors 8.

(d) While the supercritical fluid apparatus 100 is configured to be capable of supplying a modifier together with liquid carbon dioxide in the above-mentioned embodiment, the embodiment is not limited to this. The supercritical fluid apparatus 100 does not have to be configured to be capable of supplying a modifier.

(e) While the mobile phase temperature control device 10 is provided to adjust the temperature of liquid carbon dioxide in the above-mentioned embodiment, the embodiment is not limited to this. The mobile phase temperature control device 10 may be provided to adjust the temperature of not liquid carbon dioxide but a modifier, or may be provided to adjust the temperature of a mixture of liquid carbon dioxide and a modifier. Alternatively, two mobile phase temperature control devices 10 may be provided to respectively adjust the temperatures of liquid carbon dioxide and a modifier.

(f) While the supercritical fluid apparatus 100 is configured as an SFC in the above-mentioned embodiment, the embodiment is not limited to this. The supercritical fluid apparatus 100 may be configured as a supercritical fluid extraction apparatus (SFE). Alternatively, the supercritical fluid apparatus 100 may be configured as an SFC-MS provided with a mass spectrometer (MS) instead of the detector 50.

(6) Aspects (Item 1) A mobile phase temperature control device for a supercritical fluid apparatus according to one aspect may be used in a supercritical fluid apparatus including a separation column to which a mobile phase in a supercritical state is supplied, and may include a rod-shaped cartridge heater, a flow path portion that is wound around the cartridge heater and guides the mobile phase to the separation column, and a first temperature sensor that is attached to the flow path portion and detects a temperature of the flow path portion.

In this mobile phase temperature control device for a supercritical fluid apparatus, the flow path portion is wound around the rod-shape cartridge, and a mobile phase is guided to the separation column of the supercritical fluid apparatus by the flow path portion. The mobile phase is put in a supercritical state at least in the separation column. The first temperature sensor is attached to the flow path portion, and the temperature of the flow path portion is detected by the first temperature sensor.

With this configuration, because the flow path portion is wound around the rod-shape cartridge heater, heat is exchanged between the cartridge heater and the flow path portion with reduced contact heat resistance (heat loss) and high responsiveness. Here, because the first temperature sensor is attached to the flow path portion, the temperature of the flow path portion can be detected as the temperature of a mobile phase flowing through the flow path portion with high accuracy. Therefore, the temperature of the mobile phase flowing through the flow path portion can be adjusted by the cartridge heater based on the detected temperature.

Further, because the flow path portion is wound, even in a case where a sufficiently long flow path portion is used, the mobile phase temperature control device for a supercritical fluid apparatus can be maintained compact. Therefore, even in a case where the temperature of a mobile phase is low and the volume of the mobile phase is large, it is possible to efficiently adjust the temperature of the mobile phase to a predetermined temperature by using the sufficiently long flow path portion. As a result, an occurrence of a temperature gradient in regard to the mobile phase in the separation column can be suppressed.

(Item 2) The mobile phase temperature control device for a supercritical fluid apparatus according to item 1, wherein the cartridge heater may have a columnar outer shape.

In this case, the cartridge heater and the flow path portion can adhere to each other more easily. Thus, efficiency of heat exchange between the cartridge heater and the flow path portion is improved more sufficiently. As a result, an occurrence of a temperature gradient in regard to the mobile phase in the separation column can be suppressed more efficiently.

(Item 3) The mobile phase temperature control device for a supercritical fluid apparatus according to item 1 or 2, wherein the flow path portion may include an upstream end portion and a downstream end portion that come into contact with the cartridge heater, and the first temperature sensor may be attached to a position closer to the downstream end portion than the upstream end portion in the flow path portion.

In this case, the temperature of a mobile phase adjusted by the cartridge heater can be detected more accurately.

(Item 4) The mobile phase temperature control device for a supercritical fluid apparatus according to item 1 or 2, wherein a plurality of the cartridge heaters may be provided, the plurality of the cartridge heaters may be arranged in parallel with one another, and the flow path portion may be wound around the plurality of cartridge heaters.

With this configuration, because the flow path portion is wound around the plurality of cartridge heaters arranged in parallel with one another, even in a case where the flow path portion is significantly long, an increase in size of the mobile phase temperature control device for a supercritical fluid apparatus can be prevented.

(Item 5) The mobile phase temperature control device for a supercritical fluid apparatus according to item 4, wherein the plurality of the cartridge heaters may be electrically connected in series.

In this case, the temperature of a mobile phase can be adjusted more sufficiently by the plurality of cartridge heaters.

(Item 6) The mobile phase temperature control device for a supercritical fluid apparatus according to item 4, wherein the first temperature sensor may be attached to a position closer to a cartridge heater arranged most downstream than a cartridge heater arranged most upstream out of the plurality of the cartridge heaters.

In this case, the temperature of a mobile phase that has been adjusted by the plurality of cartridge heaters can be detected more accurately.

(Item 7) The mobile phase temperature control device for a supercritical fluid apparatus according to item 1 or 2 may further include a second temperature sensor that is attached to the flow path portion at a position farther upstream than the first temperature sensor and detects a temperature of the flow path portion.

In this case, the cartridge heaters can operate more precisely based on the temperatures of the portions of the flow path portion respectively detected by the first and second temperature sensors.

(Item 8) A supercritical fluid apparatus according to another aspect may include a separation column, a first supplier that supplies a first mobile phase that is put in a supercritical state at least in the separation column, a second supplier that supplies a second mobile phase used as a modifier, a mixer that mixes the first mobile phase that has been supplied by the first supplier with the second mobile phase that has been supplied by the second supplier and guides a mixture to the separation column, and the mobile phase temperature control device for a supercritical fluid apparatus according to item 1 or 2 that is provided to adjust a temperature of at least one of the first mobile phase and the second mobile phase.

With this configuration, because the temperature of at least one of the first mobile phase and the second mobile phase is adjusted by the mobile phase temperature control device for a supercritical fluid apparatus, the temperature of the mixed mobile phase can be efficiently adjusted to a predetermined temperature. Thus, an occurrence of a temperature gradient in regard to the mobile phase in the separation column can be suppressed.

(Item 9) A supercritical fluid apparatus according to yet another aspect may include a separation column, a mobile phase supplier that supplies a mobile phase, the mobile phase temperature adjustment device for a supercritical fluid apparatus according to item 7 that adjusts a temperature of a mobile phase that has been supplied by the mobile phase supplier and guides the mobile phase to the separation column, and a controller that controls an operation of the mobile phase temperature adjustment device for a supercritical fluid apparatus, wherein the controller may include a determiner that determines whether the mobile phase is flowing through the flow path portion based on a result of detection by the first and second temperature sensors of the mobile phase temperature adjustment device for a supercritical fluid apparatus, a first operation controller that controls an operation of the cartridge heater such that a temperature of the mobile phase is a preset temperature in a case where it is determined by the determiner that the mobile phase is flowing through the flow path portion, and a second operation controller that controls an operation of the cartridge heater such that the cartridge heater is turned on and off repeatedly and regularly in a case where it is determined by the determiner that the mobile phase is not flowing through the flow path portion.

With this configuration, in a case where a mobile phase is flowing through the flow path portion, the temperature of the mobile phase is adjusted to a predetermined temperature. Thus, an occurrence of a temperature gradient in regard to the mobile phase in the separation column can be suppressed. On the other hand, in a case where a mobile phase is not flowing through the flow path portion, the cartridge heaters are turned on and off repeatedly and regularly. Thus, the temperature of the flow path portion can be maintained in a predetermined range with simple control.

The invention claimed is:

1. A mobile phase temperature control device for a supercritical fluid apparatus that is used in a supercritical fluid apparatus including a separation column to which a mobile phase in a supercritical state is supplied, comprising:
   a rod-shaped cartridge heater that is provided at a position farther upstream than the separation column and preheats liquid carbon dioxide such that the liquid carbon dioxide in the mobile phase is put in a supercritical state in the separation column;
   a flow path portion that is wound around the cartridge heater and guides the mobile phase to the separation column; and
   a first temperature sensor that is attached to the flow path portion and detects a temperature of the flow path portion.

2. The mobile phase temperature control device for a supercritical fluid apparatus according to claim 1, wherein the cartridge heater has a columnar outer shape.

3. The mobile phase temperature control device for a supercritical fluid apparatus according to claim 1, wherein
   the flow path portion includes an upstream end portion and a downstream end portion that come into contact with the cartridge heater, and
   the first temperature sensor is attached to a position closer to the downstream end portion than the upstream end portion in the flow path portion.

4. The mobile phase temperature control device for a supercritical fluid apparatus according to claim 1, wherein
   a plurality of the cartridge heaters are provided,
   the plurality of the cartridge heaters are arranged in parallel with one another, and
   the flow path portion is wound around the plurality of cartridge heaters.

5. A supercritical fluid apparatus comprising:
   a separation column;
   a first supplier that supplies a first mobile phase that is put in a supercritical state at least in the separation column;
   a second supplier that supplies a second mobile phase used as a modifier;
   a mixer that mixes the first mobile phase that has been supplied by the first supplier with the second mobile phase that has been supplied by the second supplier and guides a mixture to the separation column; and
   the mobile phase temperature control device for a supercritical fluid apparatus according to claim 1 that is provided to adjust a temperature of at least one of the first mobile phase and the second mobile phase.

6. A mobile phase temperature control device for a supercritical fluid apparatus that is used in a supercritical fluid apparatus including a separation column to which a mobile phase in a supercritical state is supplied, comprising:
- a rod-shaped cartridge heater;
- a flow path portion that is wound around the cartridge heater and guides the mobile phase to the separation column; and
- a first temperature sensor that is attached to the flow path portion and detects a temperature of the flow path portion,
- wherein a plurality of the cartridge heaters are provided,
- the plurality of the cartridge heaters are arranged in parallel with one another,
- the flow path portion is wound around the plurality of the cartridge heaters, and
- the plurality of the cartridge heaters are electrically connected in series.

7. A mobile phase temperature control device for a supercritical fluid apparatus that is used in a supercritical fluid apparatus including a separation column to which a mobile phase in a supercritical state is supplied, comprising:
- a rod-shaped cartridge heater;
- a flow path portion that is wound around the cartridge heater and guides the mobile phase to the separation column; and
- a first temperature sensor that is attached to the flow path portion and detects a temperature of the flow path portion,
- wherein a plurality of the cartridge heaters are provided,
- the plurality of the cartridge heaters are arranged in parallel with one another,
- the flow path portion is wound around the plurality of the cartridge heaters, and
- the first temperature sensor is attached to a position closer to a cartridge heater arranged most downstream than a cartridge heater arranged most upstream out of the plurality of the cartridge heaters.

8. A mobile phase temperature control device for a supercritical fluid apparatus that is used in a supercritical fluid apparatus including a separation column to which a mobile phase in a supercritical state is supplied, comprising:
- a rod-shaped cartridge heater;
- a flow path portion that is wound around the cartridge heater and guides the mobile phase to the separation column; and
- a first temperature sensor that is attached to the flow path portion and detects a temperature of the flow path portion; and
- further comprising a second temperature sensor that is attached to the flow path portion at a position farther upstream than the first temperature sensor and detects a temperature of the flow path portion.

9. A supercritical fluid apparatus comprising:
a separation column;
a mobile phase supplier that supplies a mobile phase;
the mobile phase temperature adjustment device for a supercritical fluid apparatus according to claim 8 that adjusts a temperature of a mobile phase that has been supplied by the mobile phase supplier and guides the mobile phase to the separation column; and
a controller that controls an operation of the mobile phase temperature adjustment device for a supercritical fluid apparatus, wherein
the controller includes
a determiner that determines whether the mobile phase is flowing through the flow path portion based on a result of detection by the first and second temperature sensors of the mobile phase temperature adjustment device for a supercritical fluid apparatus,
a first operation controller that controls an operation of the cartridge heater such that a temperature of the mobile phase is a preset temperature in a case where it is determined by the determiner that the mobile phase is flowing through the flow path portion, and
a second operation controller that controls an operation of the cartridge heater such that the cartridge heater is turned on and off repeatedly and regularly in a case where it is determined by the determiner that the mobile phase is not flowing through the flow path portion.

\* \* \* \* \*